United States Patent [19]
Jain et al.

[11] Patent Number: 5,146,754
[45] Date of Patent: Sep. 15, 1992

[54] EXHAUST GAS DIVERTER FOR DIVIDED VOLUTE TURBOCHARGER OF INTERNAL COMBUSTION ENGINE

[75] Inventors: Adish Jain, Avon; Zdenek S. Meistrick, Bloomfield; Vincent J. Pitzi, South Windsor, all of Conn.

[73] Assignee: Jacobs Brake Technology Corp., Wilmington, Del.

[21] Appl. No.: 652,652

[22] Filed: Feb. 8, 1991

[51] Int. Cl.⁵ ............................................. F02B 37/00
[52] U.S. Cl. ..................................... 60/602; 415/151
[58] Field of Search ..................... 60/602; 137/625.41, 137/625.47, 625.48; 415/151

[56] References Cited

U.S. PATENT DOCUMENTS

| 4,138,849 | 2/1979 | Wilber | 60/602 |
| 4,165,763 | 8/1979 | Hough | 60/602 X |
| 4,220,008 | 9/1980 | Wilber et al. | 60/602 |
| 4,395,884 | 8/1983 | Price | 60/602 |
| 4,474,006 | 10/1984 | Price et al. | 60/602 |
| 4,526,004 | 7/1985 | French et al. | 60/602 |
| 4,544,326 | 10/1985 | Nishiguchi et al. | 60/602 X |
| 4,565,068 | 1/1986 | Schneider | 60/602 |

Primary Examiner—Michael Koczo
Attorney, Agent, or Firm—Robert R. Jackson

[57] ABSTRACT

A diverter for a divided volute turbocharger has a rotatable diverter member in one volute passageway of the turbocharger. The diverter member is rotatable between a first position in which the flow of gas through the associated volute passageway is unimpeded by the diverter member, and a second position in which the diverter member blocks the associated volute passageway and causes the gas from that passageway to flow through an interconnection passageway into the other volute passageway. If desired, the diverter member may block the interconnection passageway while the diverter member is in the first position.

5 Claims, 4 Drawing Sheets

EXHAUST GAS DIVERTER FOR DIVIDED VOLUTE TURBOCHARGER OF INTERNAL COMBUSTION ENGINE

BACKGROUND OF THE INVENTION

This invention relates to turbochargers for internal combustion engines, and more particularly to diverters for divided volute turbochargers.

As explained, for example, in Price U.S. Pat. No. 4,395,884 and 4,474,006, many internal combustion engines are equipped with divided volute turbochargers. At high engine speeds, exhaust gas flows through both volutes of the turbocharger. In order to improve the efficiency of the turbocharger at lower engine speeds, however, one of the two volutes of the turbocharger is closed and all of the exhaust gas from the engine is diverted to the other volute. These modifications of the flow of exhaust gas through the turbocharger are effected by a so-called diverter associated with the turbocharger turbine.

As the Price patents point out, turbocharging not only improves engine efficiency during powering mode, it also improves the engine retarding efficiency of a compression relief type engine brake which may be associated with the engine. Because little or no fuel is being consumed during engine braking, the volume of exhaust gas from the engine is substantially diminished during compression relief engine braking. Turbocharger efficiency therefore tends to decline during engine braking even though the speed of the engine may be quite high. Thus exhaust gas flow rates during compression relief engine braking may be comparable to exhaust gas flow rates during low engine speed fueling mode operation. The Price patents therefore teach the use of a turbocharger diverter (for closing one turbocharger volute and diverting all exhaust from that volute to the other volute) during both low speed fueling mode and compression relief braking mode.

While the particular diverter mechanisms shown in the Price patent have worked extremely well, they are relatively large and require relatively large and strong actuator mechanisms. In particular, the Price diverters include a gate which must be pushed transversely across one volute or the exhaust gas passageway leading to one volute of the turbocharger. The fact that these gates move linearly has led to the use of in-line linear actuators, with the result that the entire diverter plus actuator mechanism is quite long transverse to the volute axis. In addition, the pressure of the exhaust gas on the gate means that there is typically considerable frictional resistance to motion of the gate. This means that a relatively large and strong actuator is required.

In view of the foregoing, it is an object of this invention to improve and simplify diverters for divided volute turbochargers.

It is a more particular object of this invention to provide divided volute turbocharger diverters which are more compact, more easily integrated into the turbocharger if desired, and easier to operate.

SUMMARY OF THE INVENTION

These and other objects of the invention are accomplished in accordance with the principles of the invention by providing a divided volute turbocharger with a rotatable diverter member in or associated with one of the two volutes. The diverter member is preferably rotatable about an axis which is transverse to the normal (i.e., undiverted) flow of exhaust gas through the associated volute. In a first rotational position the diverter allows gas to flow through the associated volute, and may in addition obstruct an aperture in the wall which otherwise separates the volutes from one another. In a second rotational position the diverter member blocks the associated volute and causes the exhaust gas in that volute to flow through the above-mentioned aperture into the other volute. If in the first rotational position the diverter member obstructs the above-mentioned aperture, then in the second rotational position the diverter member unblocks that aperture.

Further features of the invention, its nature and various advantages will be more apparent from the accompanying drawings and the following detailed description of the preferred embodiments.

BRIEF DESCRIPTION OF THE DRAWINGS

FIG. 1 shows the diverter in the nondiverting position, and is a section taken along the line 1—1 in FIG. 2.

FIG. 5 shows the diverter in the nondiverting position, and is a section taken along the line 5—5 in FIG. 6.

DETAILED DESCRIPTION OF THE PREFERRED EMBODIMENTS

Figure 1:
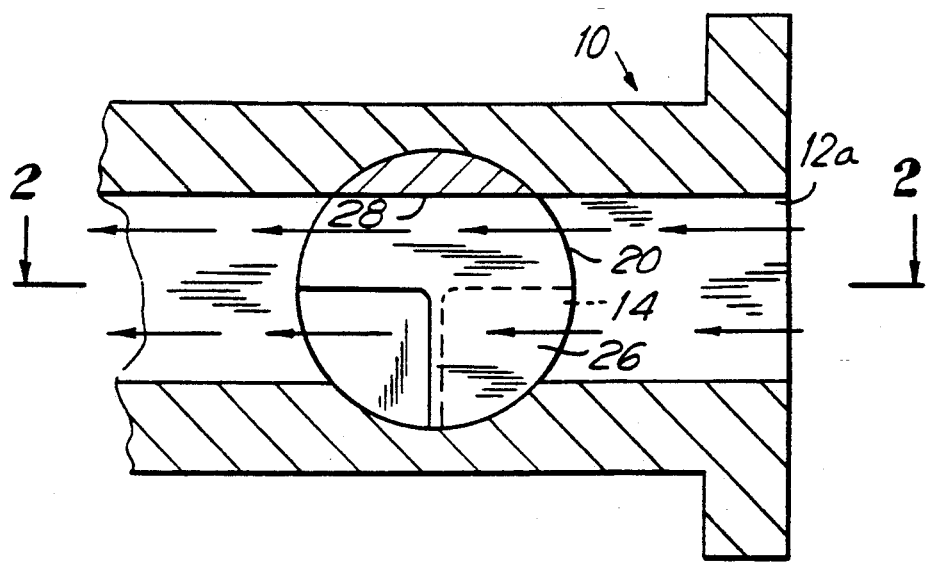
FIG. 1 is a simplified sectional view of a first illustrative embodiment of a turbocharger constructed in accordance with the principles of this invention.

The diverter structures of this invention can either be included directly in the volutes of a turbocharger, or they can be provided in exhaust gas conduits leading to the turbocharger. Because these conduits are extensions of the volutes, the term "volute passageway" is used herein and in the appended claims as a generic term for volutes per se and the conduits leading to the turbocharger.

As shown in FIGS. 1-4, a typical divided volute turbocharger 10 includes two adjacent, substantially parallel volute passageways 12a and 12b leading from the exhaust manifold or manifolds of the associated internal combustion engine (not shown) to the driving turbine (also not shown) of the turbocharger. A rotatable diverter member 20 is disposed in one of volute passageways 12a so that the diverter member extends transversely across that passageway and is rotatable about an axis 22 which also extends transversely across the passageway. One end of diverter member 20 is connected to a shaft 30 which is concentric with axis 22. Shaft 30 is accessible from outside of passageways 12 and is the means by which diverter member 20 is rotated about axis 22. For this purpose, shaft 30 may be connected to an actuator mechanism (not shown). For example, the combination of a linear actuator and a crank arm may be used to rotate shaft 30 and thereby diverter member 20.

Diverter member 20 includes a round disk 24 at the end adjacent shaft 30, an approximately three-quarter round disk 26 at the end remote from shaft 30, and a vane or gate member 28 extending between one side of each of disks 24 and 26. In the nondiverting position shown in FIGS. 1 and 2, diverter member 20 is rotated so that gate member 28 is substantially parallel to and out of the flow of exhaust gas through volute passageway 12a. The exhaust gas flow through passageway 12a is therefore unaffected by the presence of diverter member 20. In addition, a portion of three-quarter round disk 26 covers and thereby closes off an aperture 14 which is provided in the wall which otherwise separates volute passageways 12a and 12b. Both of volute passageways 12 are accordingly in normal use. This position of diverter member 20 would typically be used with the engine in fueling mode at relatively high speed.

Figure 3:
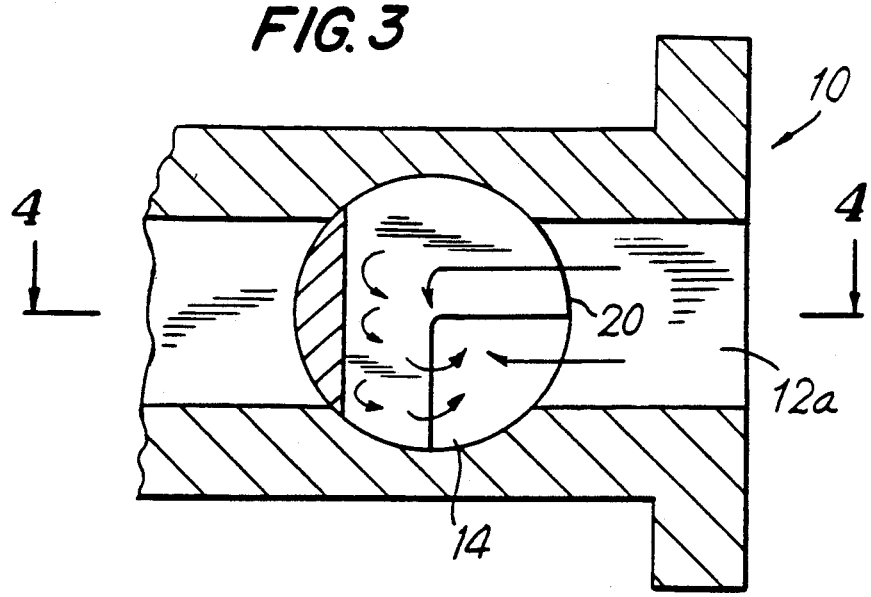
FIG. 3 is a view similar to FIG. 1 but showing the diverter in the diverting position.
Figure 4:
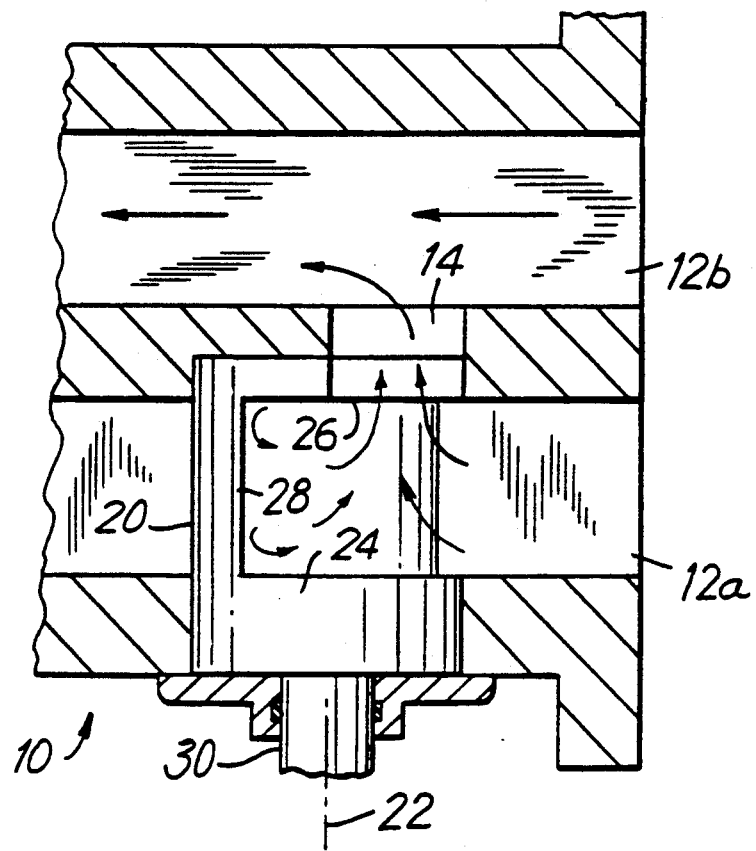
FIG. 4 is a sectional view taken along the line 4—4 in FIG. 3, with the diverter member again shown unsectioned.
Figure 5:
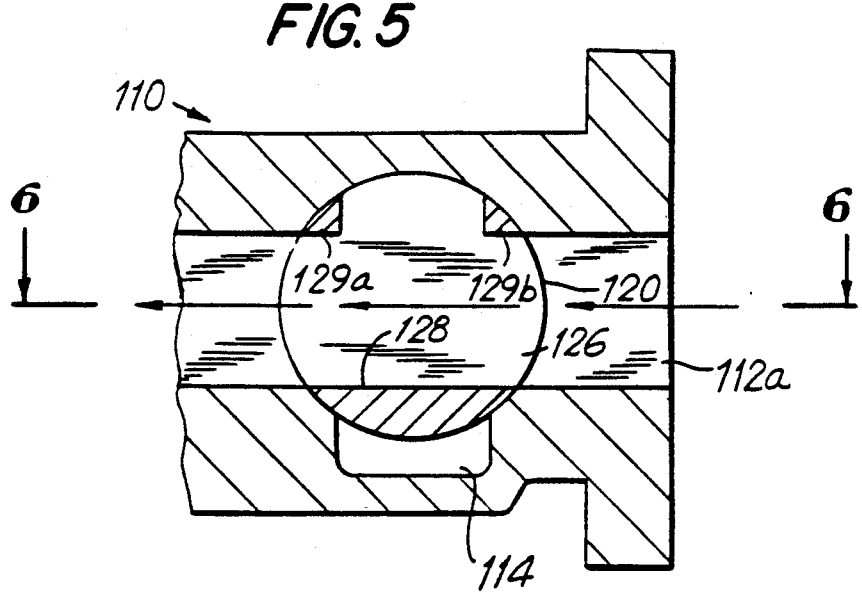
FIG. 5 is a simplified sectional view generally similar to FIG. 1 but showing a second illustrative embodiment of the invention.
Figure 6:
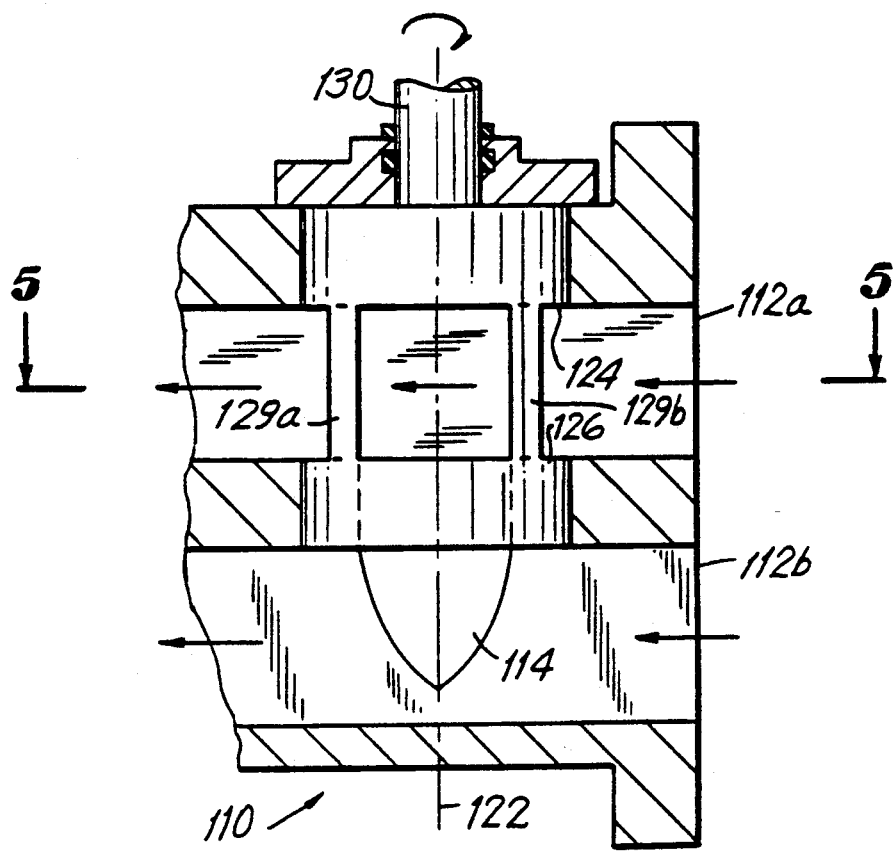
FIG. 6 is a sectional view taken along the line 6—6 in FIG. 5, with the diverter member shown unsectioned.

While the engine is in fueling mode at low speed or while the engine is in braking or retarding mode, diverter member 20 is rotated approximately 90° about axis 22 to the position shown in FIGS. 3 and 4. In this position vane or gate 28 is across volute passageway 12a and thereby blocks the flow of gas through that passageway. At the same time, the quarter which is missing from three-quarter round disk 26 moves into registration with aperture 14 so that the gas from passageway 12a is diverted into passageway 12b.

Figure 2:
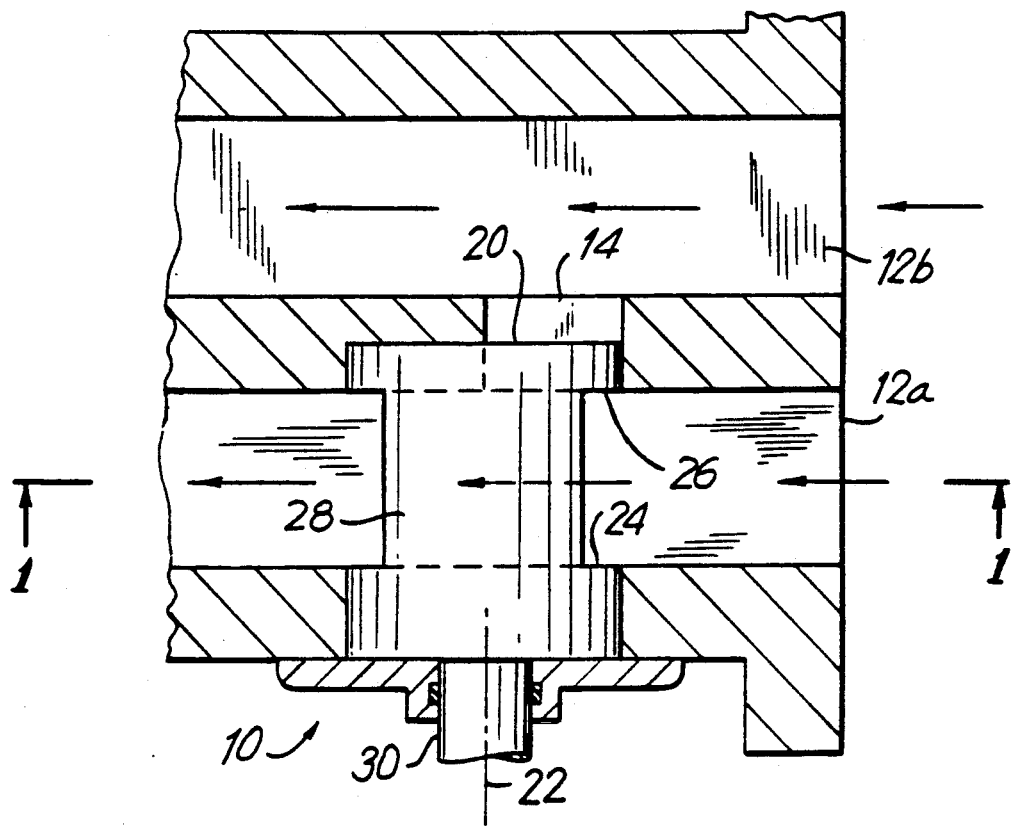
FIG. 2 is a sectional view taken along the line 2—2 in FIG. 1, with the diverter member itself shown unsectioned.

When the engine returns to high speed fueling operation, diverter member 20 is rotated back to the position shown in FIGS. 1 and 2.

In the alternative embodiment shown in FIGS. 5-8 parts which are generally similar to parts in the first embodiment have reference numbers which are increased by 100 from the corresponding first embodiment reference numbers. Diverter member 120 has two round end disks 124 and 126 joined on one side by vane or gate member 128 and joined on the opposite side by optional spokes 129a and 129b. In the high speed fueling mode position shown in FIGS. 5 and 6, diverter member 120 is rotated so that all of elements 128 and 129 are out of the flow of exhaust gas through volute passageway 112a. In addition, vane or gate 128 closes off the opening 114 which extends into passageway 112b from under diverter member 120 (as viewed in FIG. 5). Accordingly, both of volute passageways 112 are in full normal operation.

Figure 7:
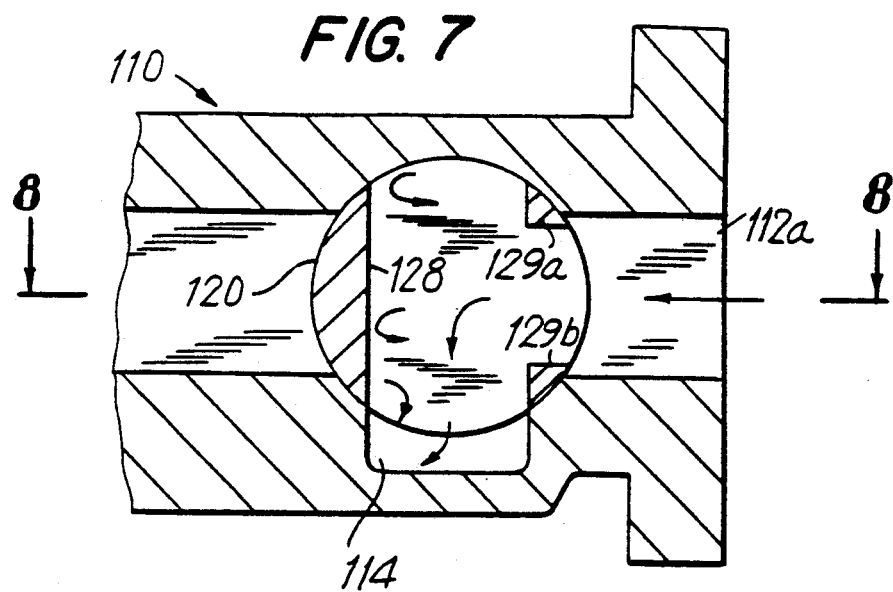
FIG. 7 is a view similar to FIG. 5 but showing the diverter in the diverting position.
Figure 8:
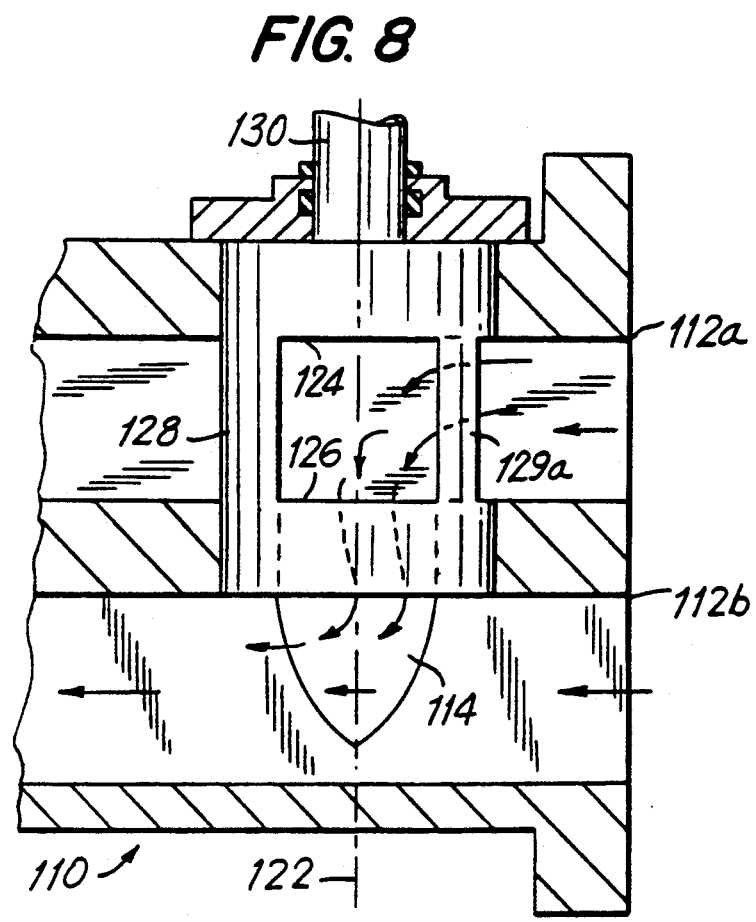
FIG. 8 is a sectional view taken along the line 8—8 in FIG. 7, with the diverter member again shown unsectioned.

When the engine goes to low speed fueling operation or switches to compression relief retarding mode, diverter member 120 is rotated 90° to the position shown in FIGS. 7 and 8. In this position, gate 128 blocks volute passageway 112a and opens passageway 114. Accordingly, exhaust gas from volute passageway 112a is diverted from that passageway through passageway 114 into volute passageway 112b just as in the first embodiment.

Because the diverter structures of this invention merely rotate the diverter member rather than reciprocating it in and out, the present diverter structures can be made much more compact than the prior art structures. This inherent compactness makes it possible to incorporate the diverters of this invention into the turbocharger itself, and particularly the volutes of the turbocharger, if desired. In addition, the forces acting on the rotating diverters of this invention are better balanced, which makes it possible to operate the present diverters with smaller actuators than are required to operate linearly reciprocating diverters.

It will be understood that the foregoing is merely illustrative of the principles of the invention, and that various modifications can be made by those skilled in the art without departing from the scope and spirit of the invention. For example, the exact shape of the diverter member is subject to considerable variation within the scope of this invention.

The invention claimed is:

1. A divided volute turbocharger diverter disposed between the exhaust manifold of an internal combustion engine and the turbine of the turbocharger comprising:
   first and second volute passageways;
   an interconnection passageway interconnecting said first and second volute passageways; and
   a diverter member disposed in only said first of said first and second volute passageways, said diverter member being rotatable about an axis between (1) a first position in which said diverter member leaves said first volute passageway substantially unobstructed and substantially closes said interconnection passageway, thereby allowing exhaust gas to flow from said exhaust manifold to said turbine via both of said first and second volute passageways, and (2) a second position in which said diverter member blocks said first volute passageway downstream from said interconnection passageway and opens said interconnection passageway so that gas from said exhaust manifold in said first volute passageway is diverted from said first volute passageway through said interconnection passageway into said second volute passageway and is thereby added to the gas flowing from said exhaust manifold to said turbine via said second volute passageway.

2. The apparatus defined in claim wherein said axis is transverse to the flow of gas in said first volute passageway when said diverter member is in said first position.

3. The apparatus defined in claim 1 wherein said diverter member comprises:
   a first end member disposed adjacent a first side wall of said first volute passageway;
   a second end member disposed adjacent an opposite second side wall of said first volute passageway, said first and second end members being substantially concentric with said axis; and
   a gate member extending between said first and second end members adjacent one side of the peripheries of said first and second end members.

4. The apparatus defined in claim 3 wherein when said diverter member is in said first position, said gate member is substantially parallel to the flow of gas in said first volute passageway but out of that flow adjacent a third side wall of said first volute passageway, and when said diverter member is in said second position, said gate member extends completely across said first volute passageway in order to block the flow of gas in said first volute passageway.

5. A divided volute turbocharger diverter comprising:
   first and second volute passageways;
   an interconnection passageway interconnecting said first and second volute passageways; and a diverter member disposed in said first volute passageway, said diverter member being rotatable about an axis between a first position in which said diverter member leaves said first volute passageway substantially unobstructed, and a second position in which said diverter member blocks said first volute passageway downstream from said interconnection passageway so that gas from said first volute passageway flows through said interconnection passageway into said second volute passageway, wherein said diverter member comprises:

a first end member disposed adjacent a first side wall of said first volute passageway;

a second end member disposed adjacent an opposite second side wall of said first volute passageway, said first and second end members being substantially concentric with said axis; and a gate member extending between said first and second end members adjacent one side of the peripheries of said first and second end members, wherein said interconnection passageway is connected to said first volute passageway via a first aperture formed in said first side wall of said first volute passageway, wherein said first end member has a second aperture which registers with said first aperture when said diverter member is in said second position, and wherein said first end member blocks said first aperture when said diverter member is in said first position.

* * * * *